United States Patent [19]

Akama

[11] 4,090,558
[45] May 23, 1978

[54] HEAT EXCHANGING APPARATUS FOR INDUSTRIAL FURNACES

[75] Inventor: Kazuo Akama, Kasugai, Japan

[73] Assignee: Daido Steel Co., Ltd., Aichi, Japan

[21] Appl. No.: 677,650

[22] Filed: Apr. 16, 1976

[30] Foreign Application Priority Data

| Apr. 16, 1975 | Japan | 50/46048 |
| Jun. 24, 1975 | Japan | 50/78238 |
| Sep. 4, 1975 | Japan | 50/107404 |

[51] Int. Cl.² .......................... F28D 7/12; F28F 13/00
[52] U.S. Cl. .................................... 165/155; 165/135; 165/156
[58] Field of Search ................... 165/155, 156, 52, 66, 165/154, 164, 135

[56] References Cited

U.S. PATENT DOCUMENTS

| 1,077,160 | 10/1913 | Reese | 165/155 |
| 1,856,771 | 5/1932 | Loeffler | 165/155 |
| 2,847,193 | 8/1958 | Carter | 165/155 |
| 2,861,781 | 11/1958 | Cohen | 165/155 |
| 2,870,997 | 1/1959 | Soderstrom | 165/155 |
| 2,969,967 | 1/1961 | Buhrer | 165/155 |
| 3,087,253 | 4/1963 | Wulf | 165/155 |

Primary Examiner—Charles J. Myhre
Assistant Examiner—Margaret A. LaTulip
Attorney, Agent, or Firm—Browdy and Neimark

[57] ABSTRACT

The present invention provides a heat exchanging apparatus with a silencing means comprising:
- a generally upright cylindrical body, connected to the outlet of a radiant tube and made of multiple cylinders;
- an outermost narrow cylindrical passage of air to be heated, being defined by a pair of parallel cylinder walls leading the air upwards therethrough;
- a downward air passage, communicating with the upward cylindrical passage of air, disposed concentrically therewith on the inner side thereof;
- a passage for high temperature exhaust gas formed inside the upward passage of air concentrically therewith in order to completely enclose combustion noise; and
- at least one resonator for absorbing the noise disposed inside the upward air passage.

11 Claims, 20 Drawing Figures

HEAT EXCHANGING APPARATUS FOR INDUSTRIAL FURNACES

FIELD OF THE INVENTION

The present invention relates to heat exchangers or recuperators for industrial furnaces, i.e., heat exchangers for preheating air from the atmosphere which is to be supplied to industrial furnaces, especially to radiant tube type furnaces in order to burn fuel efficiently, i.e., to recuperate heat from the exhaust gas, and more particularly relates to heat exchangers with silencer(s) or silencing means which are provided therewith to diminish or absorb noise arising from fuel combustion.

BACKGROUND OF THE INVENTION

In conventional furnaces for heating or heat treatment, heat radiation by a radiant tube of the combustion type has been widely employed. It has been esteemed as highly economical in the operation cost compared to electrical heating, at least in the furnaces in the neighborhood of 800° C. It can not be, however, free from some problems or shortcomings, which have even been growing in recent time. Some of those problems or shortcomings will be mentioned by way of example:

(1) The furnace size has been growing larger aiming at the improvement of its thermal efficiency and productivity, with the result of installing multiple radiant tubes in one furnace, which brings about increasing of the ambient temperature and the combustion noise.

(2) The amount of fuel burnt in one burner has been increased for getting a larger combustion heat at a time for the same purpose as the above, which also brings about increasing of the environmental temperature and the noise in proportion thereto.

(3) The above two matters caused some new problems by bringing about a deterioration of the working environment and a sound nuisance to the regional community. As a countermeasure for preventing the noise nuisance, an attempt to cover the entire factory building with sound absorbing materials was made. A tremendous cost and undue rising of the room temperature doomed it as impracticable.

(4) Another attempt was made, in addition to the above measure, of installing air conditioning equipment in the factory, which was of course too expensive to be practiced.

(5) In the furnaces of the conventional type to be used at a temperature lower than 800° C the effect of air preheating by means of a heat exchanger is far inferior to those used at 1,000° C or higher. The preheated temperature of the air does not exceed 250° C and the rise of thermal efficiency can not be expected to be more than 10 – 13%. Trying to raise this efficiency unreasonably is frustrated by the rising of the back-pressure in the burner, which deteriorates the combustion conditions. It has been generally said that an air preheating does not pay in furnaces operating at less than 800° C.

SUMMARY OF THE INVENTION

The present invention has as its objects (1) the provision of a highly efficient exchanger for an industrial furnace including an air preheating means as well as a silencer and (2) some methods therefor which eliminates the above problems or shortcomings when used in conventional type furnaces, by means of fully utilizing the heat from the combustion exhaust gas for preheating the combustion air, lowering the temperature of the exhaust gas as much as possible, and minimizing the public nuisance of noise from the radiant tube, through a sound absorbing method and means, to the inside and outside of the factory.

In the furnaces for heating or heat treatment of the type radiating heat from a radiant tube which burns fuel, for example LPG, in the burner, (a) high temperature exhaust gas is led from the radiant tube to the main body of an upright elongated heat exchanger made of a plurality of cylinders, (b) air from the atmosphere — in some cases it may be pressurized beforehand up to a few atmospheres — is put into a cylindrically shaped passage formed between the cylinders for upward flow and is flowed downwardly through another passage having an ample contacting surface area of various designs with the high temperature exhaust gas. In the meantime the rising exhaust gas and the descending air perform the heat exchange as much as possible through the intermediary of the boundary walls of the air passage, and (c) the noise is absorbed on one hand by the structural design of the heat exchanging mechanism and on the other hand by the incorporation of a resonator or resonators within the heat exchanger.

The primary purposes of this invention reside in utilizing the heat from the radiant tube of an industrial furnace of the combustion type to the maximum extent and in eliminating the accompanying combustion noise. There are many modifications to this invention as will be later described; so only the basic concept, structure and methods will be summarized here prior to the detailed description of the embodiments.

The heat exchanger in accordance with this invention is a generally upright cylindrical body, connected to the outlet of the radiant tube, and made of multiple cylinders; at the outermost portion is formed a fairly narrow cylindrically shaped passage of air to be preheated, which is led from the atmosphere at normal temperature and pressure and sent upwards; this air is directed from the top of the heat exchanger downwardly through a passage disposed inside. High temperature exhaust gas from the radiant tube is blown upwardly through the central parts of the heat exchanger. It must come into contact with the air to be preheated along the largest possible area; it is to impart its heat to the air on both sides, i.e., the ascending and descending air. Consideration is given to the expansion of the contact area on both the descending air passage and the ascending exhaust gas passage; for example, providing expanded and contracted portions of some kind on either or both of them. This arrangement is simultaneously aimed at a noise diminishing effect. For the purpose of noise absorption a resonator or resonators are mounted; depending upon the size and shape of the resonator, sound waves of specific wavelengths are effectively absorbed. Positions for disposing the resonator are particularly taken into consideration so as to maximise the noise prevention effect. (A silencer, a resonator or noise diminishing means is hereinafter simply referred to as a silencer.)

BRIEF DESCRIPTION OF THE DRAWINGS

Some embodiments of this invention will be in detail description, only by way of example, referring to the drawings in which.

DETAILED DESCRIPTION OF THE EMBODIMENTS

Prior to the detailed description of the embodiments, the mechanism and the features of this invention will be stated based on the fundamental structure, method and characterization, referring somewhat to the modifications.

According to this invention there is provided a heat exchanger with a silencer having a main body, generally upright cylindrically shaped, made of a plurality of cylindrical walls, which comprises:

(a) a cylindrically shaped passage for the upward flow of air to be preheated, which is disposed at the outermost portion of the main body, in some modifications it may be partitioned spirally with a spiral diaphragmatic web, (b) a downward passage for flow of the air having some enlarged and reduced portions for heat exchange with high temperature exhaust gas, which is disposed concentrically with and in the central portion of the main body. It may be, depending upon the embodiments, a coil tube, a cylindrical narrow space partitioned spirally with a spiral diaphragmatic web, or a fairly thick pipe with a plurality of expanded portions and contracted portions, (c) an upward passage for high temperature exhaust gas having some enlarged and reduced portions, which is disposed concentrically with and in the center of the main body and in contact with two of the air passages — ascending and descending — for imparting the most possible heat to the air to be preheated. It may be, depending on the embodiments, a cylindrical thick tube surrounding the air preheating tube with some expanded portions inwardly, a narrow cylindrical space embraced by two of the almost similarly shaped upward-and-downward air passages, or a series of transversely partitioned spaces embracing a plurality of plenum chambers, including one of them per section, in the center of the main body, (d) an inlet of air to be heated, (e) an outlet of preheated air, (f) an inlet of exhaust gas, (g) an outlet of exhaust gas, (h) resonator(s), (i) ultrasonic wale producing means in some cases, for conspicuously improving the heat exchangeability.

This invention is characterized in that (1) the air taken from the atmosphere is flowed upwardly and downwardly for contacting with the high temperature exhaust gas along the largest possible area through the bidirectional course, during which maximum heat exchanging is performed; (2) a considerably complex structure of upward and downward passages, such as spirally partitioned cylindrical passages, coiltubes, coiltubes with expanded diameter portions and contracted diameter portions, fairly thick tubes with some expanded portions provided with longitudinal fins therebetween, and plenum chambers of exhaust gas disposed in the center of the main body, etc. are for enhancing the ability of heat exchange and noise absorption, (3) a resonator or resonators disposed in the main body are for diminishing the combustion noise as much as possible, most of which are positioned in the central portion for preventing the noise from going out; (4) ultrasonic wave producing means disposed in some embodiments are for improving the heat exchangeability and at the same time for simplifying the maintenance of heat exchangers.

Figures 1, 2:
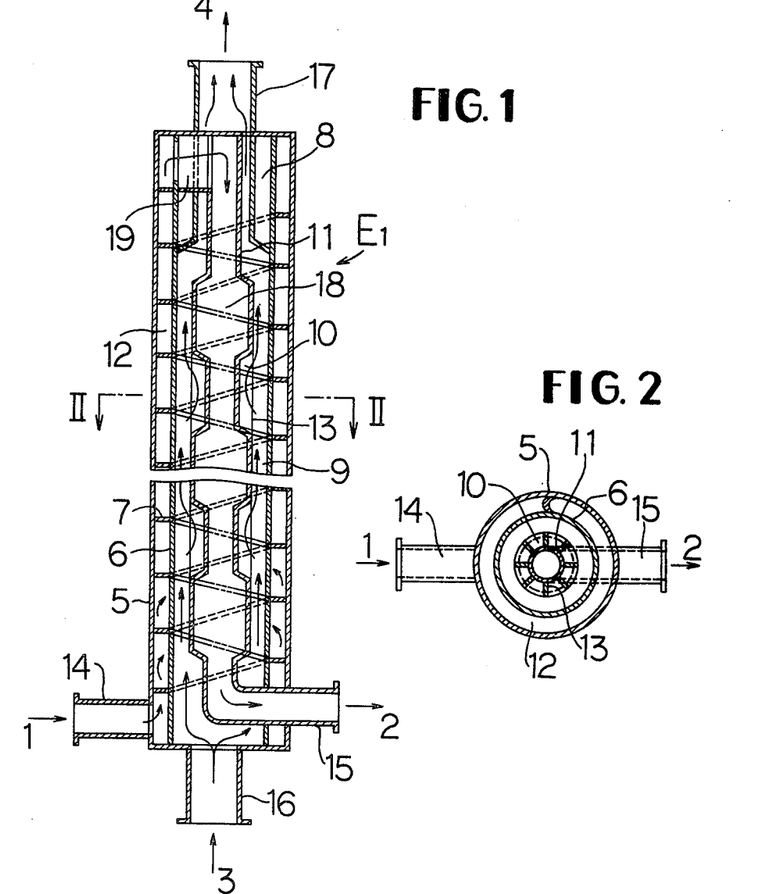
FIG. 1 is a vertical sectional front view of a heat exchanger, partly broken away, of the first embodiment in accordance with this invention.
FIG. 2 is a transverse sectional view taken along the line II — II of FIG. 1.

In the first embodiment of a heat exchanger with a silencer, the heat exchanger $E_1$ (hereinafter simply referred to as an apparatus), as can be seen in FIGS. 1 and 2, is generally a cylindrical elongated body, whose outermost periphery is defined by an external cylinder 5; inside of which is disposed an internal cylinder 6; the cylindrical narrow space formed therebetween is a passage 12 for the air to be preheated, which passage is partitioned by a spiral diaphragmatic web 7. The air 1 taken from the atmosphere at the air inlet 14 is directed upwardly through the passage 12, and it is in communication with the air preheating tube 11 at the top portion of the apparatus through a connecting tube 19. The tube 11 is disposed within the internal cylinder 6 with a given distance therebetween. The air 1 coming down through the tube 11 is discharged at the air outlet 15 as preheated air 2, which is sent into a burner (not shown) as the combustion air.

The air preheating tube 11 is provided with a plurality of expanded portions 18, between which are disposed longitudinal fins 13 on the external tube wall surface. The space between the internal cylinder 6 and the tube 11 is a passage 9 for the high temperature exhaust gas 3 which enters at the exhaust gas inlet 16 and is discharged at the top at outlet 17. At the top portion of the apparatus is firmly attached a resonator 8 on the wall surface of the internal cylinder 6. Places where the fins 13 are disposed on the outer surface of the air preheating tube 11 constitute expanded portions 10 for the exhaust gas passage 9.

In this embodiment LPG was used as fuel and the exhaust gas 3 imparted its heat to the air 1 of room temperature 20° C while the former passing upwardly through the passage 9; the air 1 was discharged from the outlet 15 as preheated air 2 of approximately 600° C after having passed through the passage 12 and the preheating tube 11. On the other hand the exhaust gas 3 which indicated a temperature of approximately 800° C when burnt in the radiant tube (not shown) entered at the exhaust gas inlet 16 to be deprived of its heat and was silenced at the expanded portion 10 with fins 13 and at the resonator 8 while passing through the exhaust gas passage 9 whose sectional area varies repeatedly from a contracted one to an expanded one and vice-versa; it showed a temperature of about 200° C as low temperature exhaust gas when it was discharged at the outlet 17 of the exhaust gas. As to the silencing, the traditional value of 116 phons at a place 1.5m away from the sound source was reduced to 70 phons due to the invented apparatus.

Figure 3:
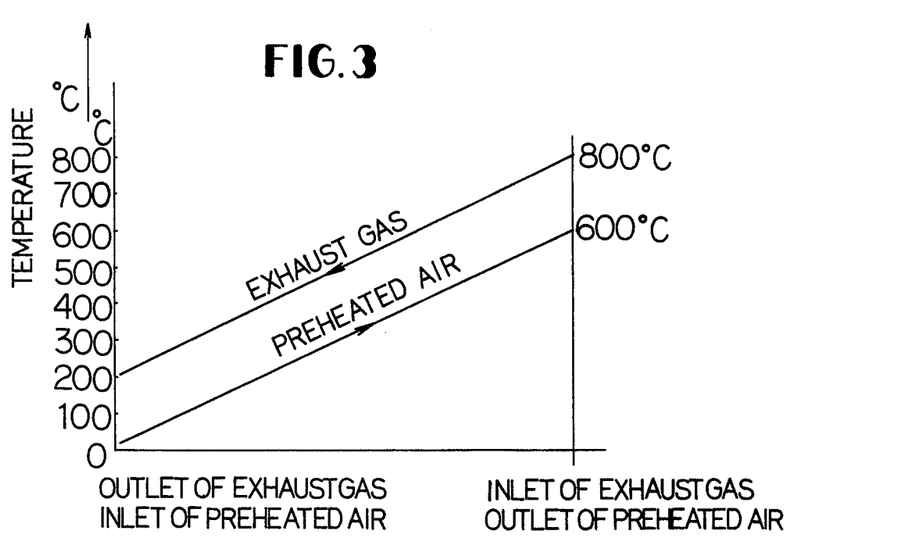
FIG. 3 is a graph indicating the trend lines of the heat exchanged between exhaust gas and air plotted to show the results obtained from the first embodiment.
Figure 4:
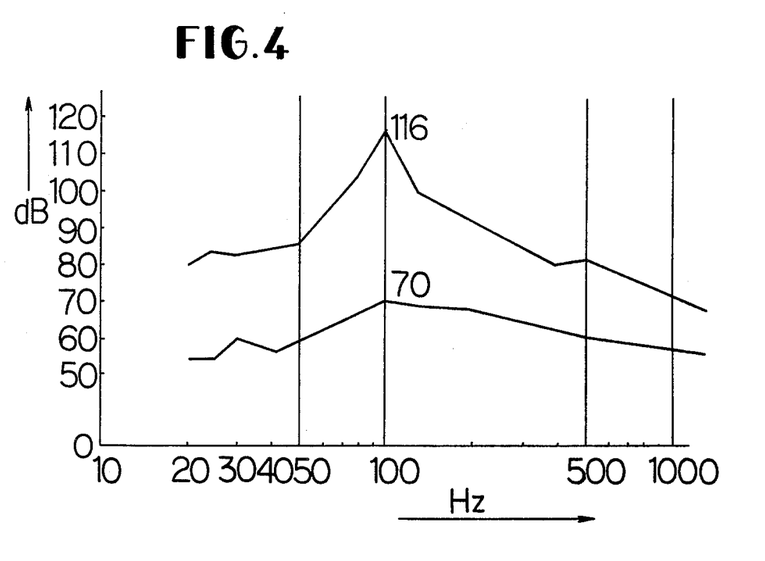
FIG. 4 is a graph indicating the sound absorbing effect according to the first embodiment.

FIG. 3 indicates the trend of the temperature rise of the preheated air and the temperature drop of the exhaust gas by means of the heat exchanger with a silencer according to this invention. FIG. 4 indicates the rate of sound absorbing effect plotted according to respective cycles of combustion noise based on data of experiments carried out at the same time as FIG. 3. Most of the noises of this kind belong to the frequency zone ranging from 50 – 500Hz, which is difficult to be absorbed by sound absorbing materials. The remarkable effect of this apparatus is thus eloquently proved.

As described above the conventional highest preheated air temperature of 250° C has been raised to more than 600° C and the possible reducing limit of the noise was improved from 85 – 90 phons down to around 70 phons. The blowing off the pilot burner which was often experienced in the traditional heat exchanger due to the pressure-up in the burner to 80 – 120 mmAq has completely been relieved.

Figures 5, 6, 16:
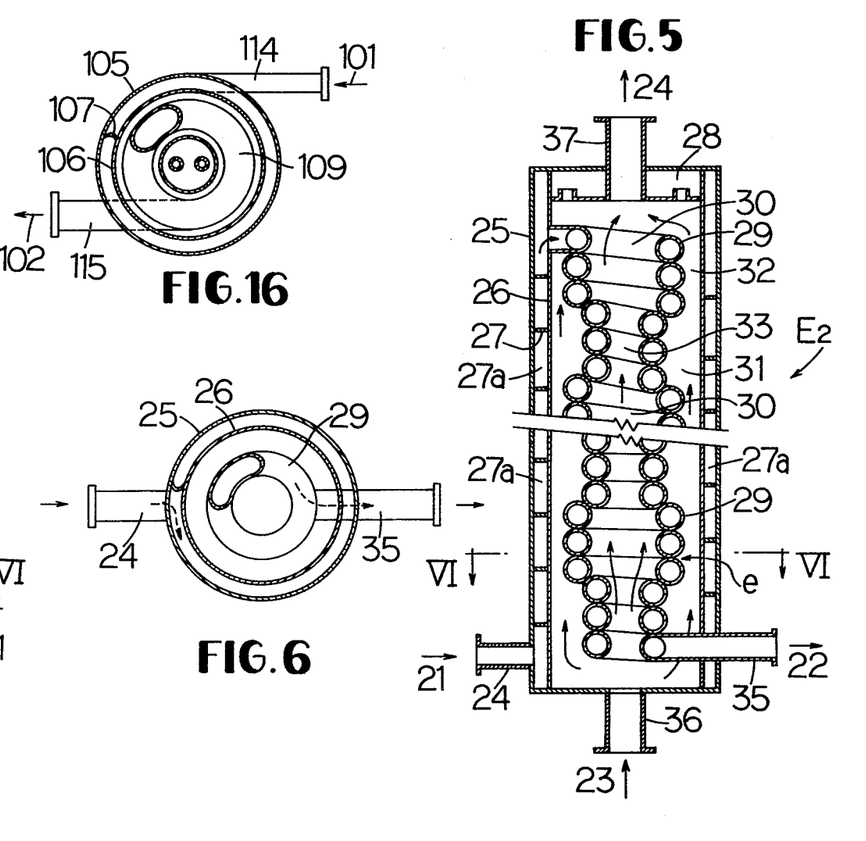
FIG. 5 is a vertical sectional front view of a heat exchanger of the second embodiment.
FIG. 6 is a transverse sectional view taken along the line VI — VI of FIG. 5.
FIG. 16 is a transverse sectional view taken along the line XVI — XVI of FIG. 15.

In the second embodiment of a heat exchanger $E_2$ with a silencer, the general view of the heat exchanger $E_2$ is substantially similar to the first embodiment, and is shown in FIGS. 5 and 6, i.e., an upright cylindrical one. Between an external cylinder 25 and an internal cylinder 26 is disposed a narrow cylindrical space used as a passage 27a for the air to be preheated, which is in communication at the top with an air preheating tube 29. The tube 29 is a coil-tube with a small gap e, the clearance between the neighboring coils, that is a relatively closely wound coil-tube, the bottom of which is connected to the preheated air discharging outlet 35; and the preheated air 22 is led to the burner (not shown) as combustion air. The coil-tube 29 is gradually enlarged and reduced in its coil diameter, consequently the sectional area of the coil is alternately expanded and contracted, i.e., expanded portion 30 and contracted portion 33. The exhaust gas 23 is introduced from the inlet 36 and the exhaust gas is flowed upwardly in a passage enveloped by the internal cylinder 26, through the inside and outside of the coil. The outside portion between the cylinder 26 and the coil tube 29 is thus also provided with some expanded portions 31 and contracted portions 32. At the top portion of the apparatus are disposed resonators 28. The air 21 at room temperature is introduced into the passage 27a through an air inlet 24, which air is directed into the coil tube 29 after having risen to the top, and is imparted the heat from the rising exhaust gas 23 along the wall surface of the internal cylinder 26 and the outer surface of the coil tube 29. The existence of the expanded portions and the contracted portions on the coil tube 29 as well as the exhaust gas passage extremely increases the heat exchangeability and sound absorption. When the coil tube 29 itself is expanded by the heat, it will make the clearance e between the neighboring coils almost zero accompanied by the more clear-cut effect.

In this embodiment, the exhaust gas of 820° C at the inlet was discharged at the outlet at 210° C (graph is not shown) and the air at 20° was preheated up to 630° C; the conventional preheated temperature of air of 250° C is out of the question.

Figure 7:
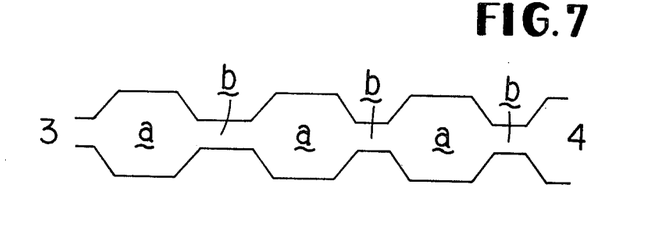
FIG. 7 is a view explaining the change of the section of the exhaust gas passage.

The sound absorbing effect is also very high in this embodiment, and the conventional value of the noise 116 phons or more, has been reduced to 68 phons. These results prove the high efficiency of the apparatus of this type where the expanded portions a and the contracted portions b are alternately arranged, as shown in FIG. 7.

Figures 8, 9, 10:
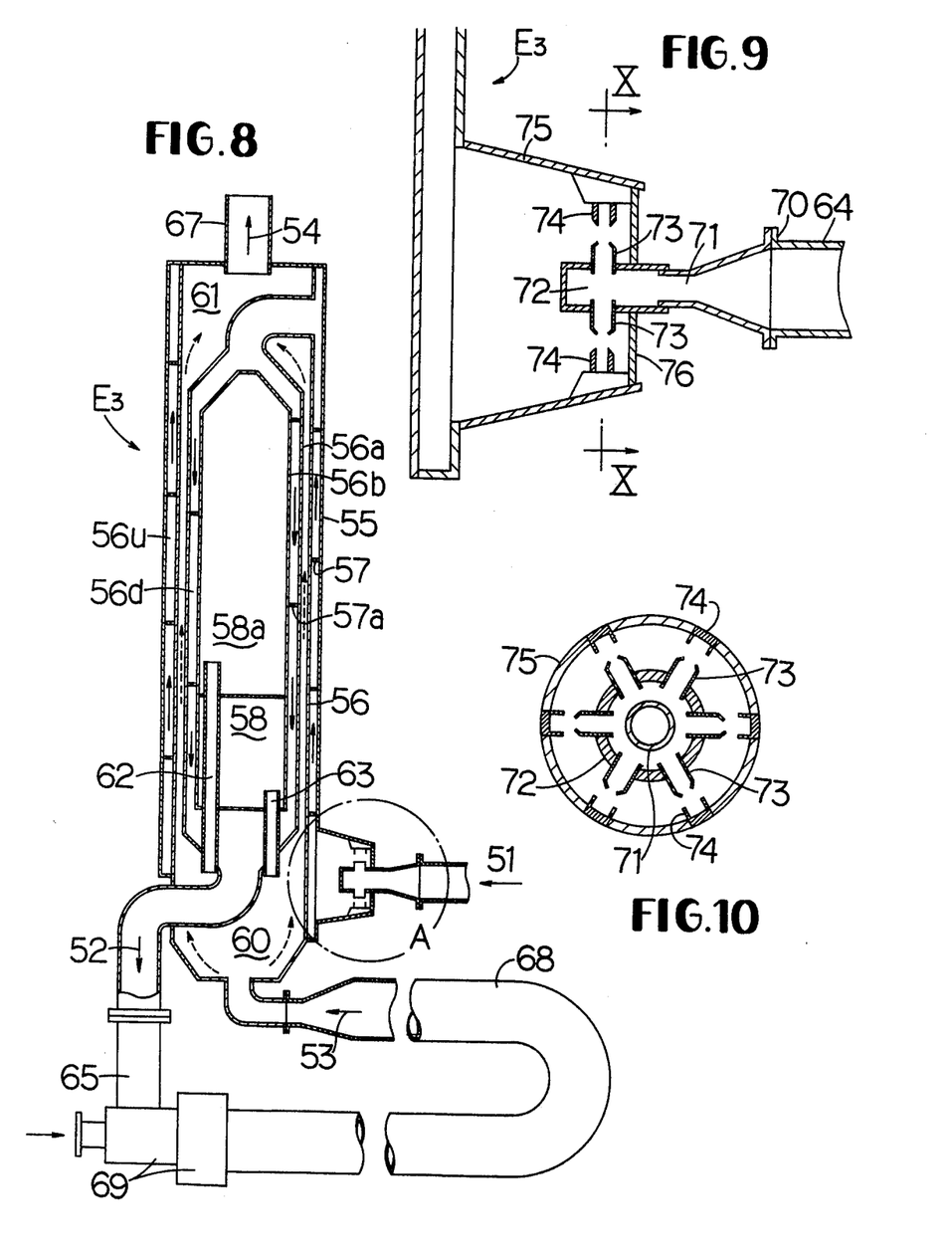
FIG. 8 is a vertical sectional front view of a heat exchanger of the third embodiment.
FIG. 9 is an enlarged view of an essential part A of FIG. 8.
FIG. 10 is a transverse sectional view taken along the line X — X of FIG. 9.
Figures 11, 12:
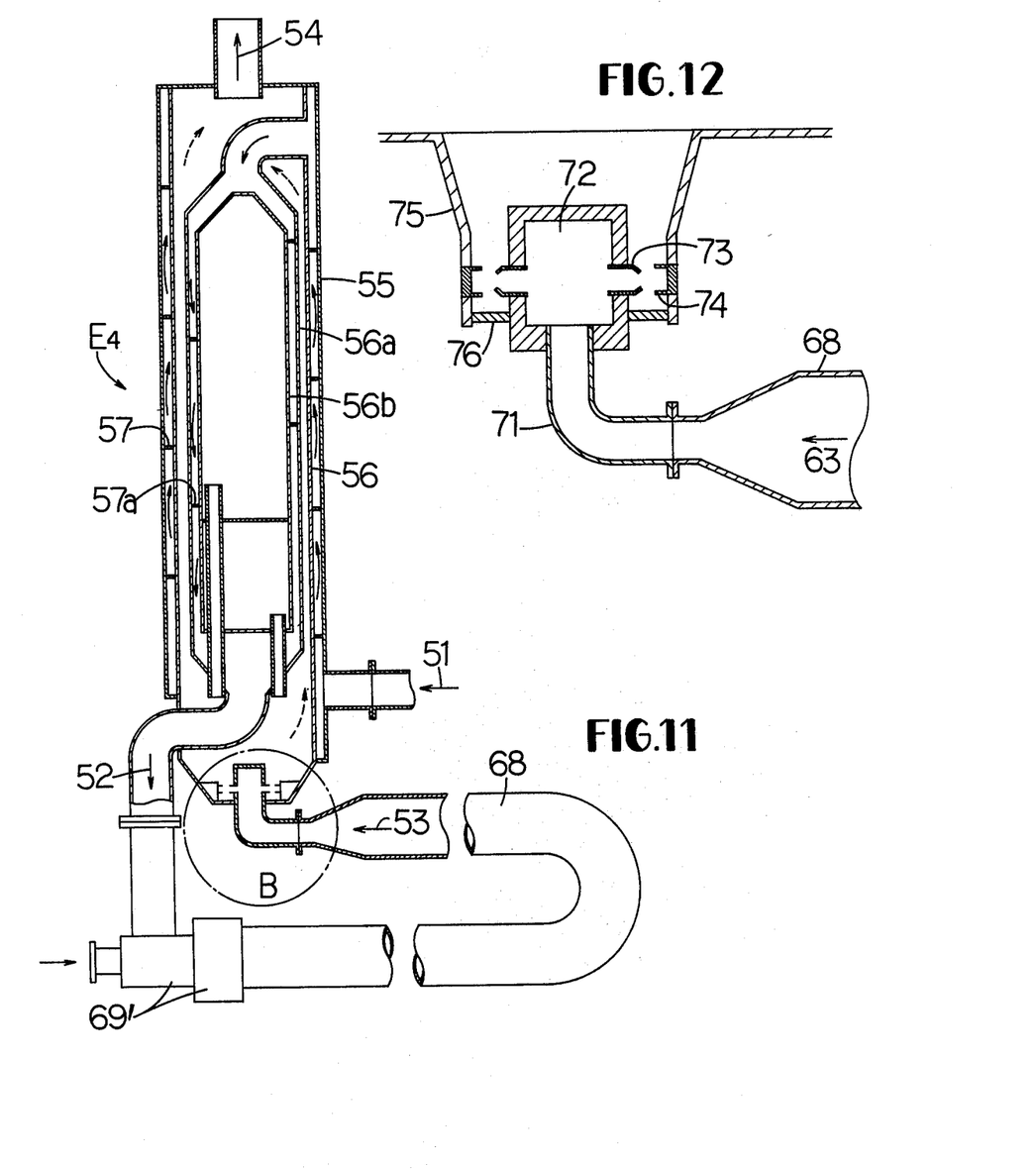
FIG. 11 is a vertical sectional front view of a heat exchanger of the fourth embodiment.
FIG. 12 is an enlarged view of an essential part B of FIG. 11.

In the third and fourth embodiments of a heat exchanger $E_3$ and $E_4$ with a silencer, the general view of the apparatuses are substantially similar to the above two embodiments, as shown in FIGS. 8 and 11.

Fairly large differences, however, reside in that these two embodiments are provided with an ultrasonic wave producer respectively so as to improve the heat exchangeability and in that the air to be preheated is pressurized to a few atmospheres beforehand by a compressor or a blower.

The pre-pressurized air 51 at room temperature is introduced into an air passage 56u through an air feeding tube 64, in both apparatuses $E_3$ and $E_4$, formed between a first external cylinder 55 and a first internal cylinder 56 and is then directed downwardly through an air preheating air 56d formed between a second external cylinder 56a and a second internal cylinder 56b. Air passage 56u and air preheating tube 56d are both partitioned by a spiral diaphragmatic web, respectively, 57 and 57a.

The air is heated by the later described high temperature exhaust gas 53 which rises upwardly through a narrow cylindrical passage formed between the air passage 56u and air preheating tube 56d, and is finally sent to the burner 69, 69' through an outlet 52 to the air discharging tube 65 as the preheated air 2.

The high temperature exhaust gas 53 rises through the narrow cylindrical space between the ascending air passage 56u and the descending air preheating passage 56d. While passing through the space between the first internal cylinder 56 and the second external cylinder 56a, the rising exhaust gas 53 imparts its heat to the ascending and descending air for being discharged at the outlet 67 into the atmosphere as low temperature exhaust gas 54. As to the silencing of the combustion noise, in cooperation with expanded chambers 61 at the top and 60 at the bottom, resonators 58 and 58a which are respectively in communication with the expanded chamber 60 through pipes 62 and 63 are highly ascribable thereto; in particular the shape and size of a resonator is said to be effective to some sounds of specific wavelength.

Now the structure and advantage of the above mentioned ultrasonic wave producer will be described.

This ultrasonic wave producing means is to be disposed at the heat giving and/or the heat receiving gas side, i.e., at the side of the air and/or the side of the exhaust gas; when it is equipped on both sides the effect will be cumulative. As shown in FIGS. 8, 9, and 10, pre-pressurized air 51 is led, through a choked conduit 71 connected to the air feeding tube 64 with a flauze 70, into the apparatus $E_3$; a plurality of radially disposed nozzles 73 on the end portion of the pressure-equalizing chamber 72 and a plurality of resonators 74 open respectively in confrontation with said nozzles 73 constitute a sort of "Hartmann's Air-Jet Sound Generator"; ultrasonic waves generated here vibrate the air in the surrounding space by the projection wall 75 and the reflection plate 76. A similar means on the side of the exhaust gas is illustrated in FIGS. 11 and 12; a Hartmann's or a steam jet, for example a "Savory" where a lower pressure is allowable, is utilized in this case. When the Hartmann is used, the burner 69' must be of high pressure (recycle type). Applications of the ultrasonic waves in the industrial fields are fairly wide spread, for example, in the fine granulation of liquid fuels; the application in the field of heat exchanging, is, however, not developed. The effects of the present application are presumed to come from the following two reasons: (a) the ultrasonic waves impart movement to the gas molecules and promote heat exchangeability through causing the collision between the gas molecules which are intrinsically of low heat conductivity; and (b) ultrasonic waves having the nature of keeping directionally straight advance, reflect to and from the wall surfaces almost without being damped, and stir thereby destroying the boundary layers of stationary gas molecules sticking to the wall surfaces of gas passages in the apparatus.

The above movement of gas molecules makes fresh molecules accessible in place of stationary molecules along the wall surfaces and improves the rate of heat exchanging. In this embodiment the exhaust gas which was at 800° C in the expansion chamber 60 (LPG used as fuel) came out of the outlet 67 at a temperature of 120° C. The air 51 of 20° C at the inlet 64 was preheated up to 720° C when it was discharged from the apparatus $E_3$. The employment of ultrasonic waves raised the heat exchangeability by 2.5 times as much as compared with the conventional one, which means that the area needed for the heat transference has been reduced to 1/2.5 of the conventional one. It permits making heat exchanging apparatus in this field quite compact, which is a great contribution to the industry. Another important advantage resides in the matter of maintenance of the heat exchangers. The ultrasonic waves make it difficult for soot, dust, and other materials to stick to the wall surfaces through the vigorous movement of the gas molecules, and make it unnecessary to periodically check or clean the apparatus, if otherwise necessary, remarkably decreasing the temporary stoppage of operation.

Figures 13, 14:
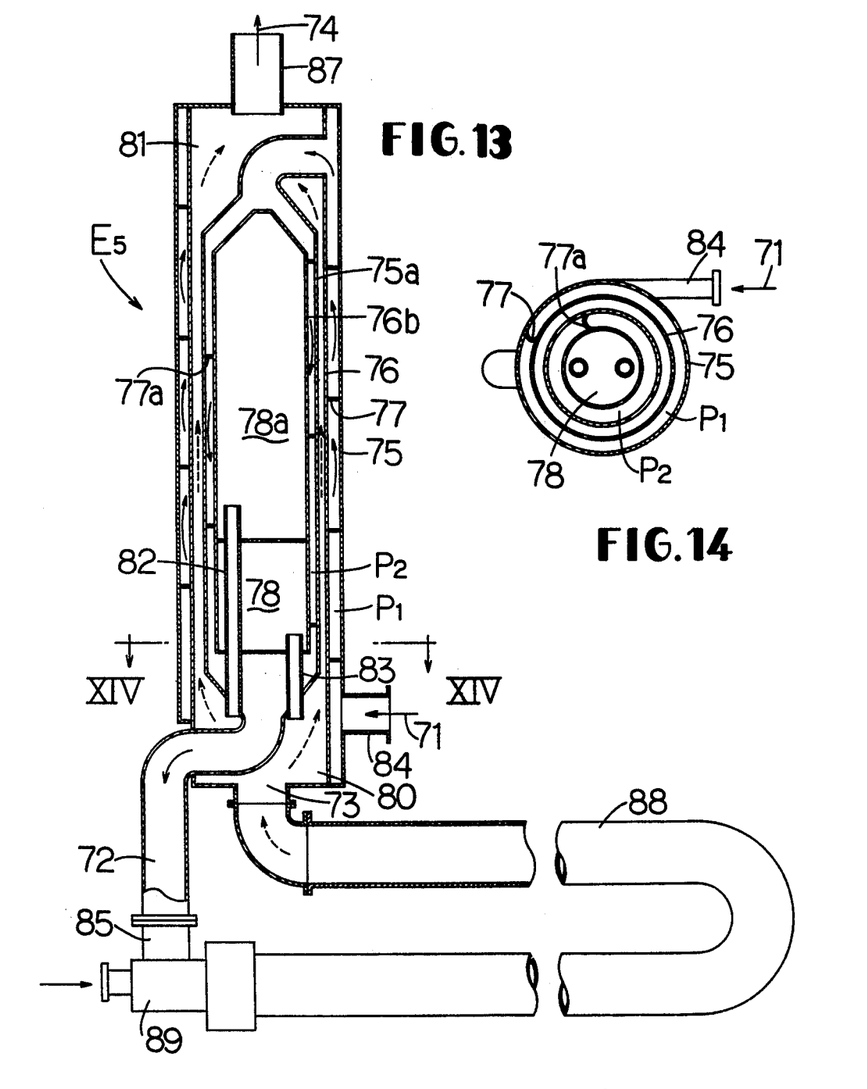
FIG. 13 is a vertical sectional front view of a heat exchanger of the fifth embodiment.
FIG. 14 is a transverse sectional view taken along the line XIV — XIV of FIG. 13.

In the fifth embodiment $E_5$ the air 71 cominb into the heat exchanger at the air feeding tube inlet 84 from the atmosphere is, as can be seen in FIGS. 13 and 14, directed upwardly and then downwardly passing through two fairly narrow cylindrical passages $P_1$ and $P_2$ partitioned with a diaphragmatic web 77 and 77a respectively; the upward air passage $P_1$ is defined by a first external cylinder 75 and a first internal cylinder 76 and the downward air preheating passage $P_2$ is defined by a second external cylinder 75a and a second internal cylinder 76b. The high temperature exhaust gas 73 is led from the radiant tube 88 to the expanded bottom portion 80 of the apparatus and flowed up through a narrow cylindrical passage sandwiched between the two air passages $P_1$ and $P_2$ — ascending and descending — while performing heat exchanging, finally being discharged at the top through the exhaust gas outlet 87 of the exhaust gas as low temperature exhaust gas 74. In the central part of the main body are disposed two resonators 78a and 78 which are respectively in communication with the expanded portion 80 through connecting pipes 82 and 83. Heat exchange is performed between the ascending and descending air and the rising high temperature exhaust gas 73 sandwiched between the two air passages $P_1$ and $P_2$ through a vast area of contact formed by this cylindrical structure with diaphragmatic webs 77 and 77a, respectively. In cooperation, the expanded portions at the top and bottom 81 and 80 having a large noise absorbing function, the abovementioned two resonators efficiently work in diminishing the combustion noise from the radiant tube; the centrally placed position of the resonators 78a and 78 being completely enveloped by the multiple cylindrical walls are extremely effective in preventing the noise from going out of the apparatus $E_5$. The resonators in this embodiment are specifically effective in absorbing the sound waves around 100Hz. The variation of their relative size and shape, which is permissible, may be possibly applied to other desired cycles of sound waves. In this case the air of room temperature can be preheated up to around 600° C when it is supplied to the burner 89; and the exhaust gas 73 fed through the inlet 86 at about 800° C is deprived of the heat to become low temperature exhaust gas 84 at around 200° C when it is discharged at the outlet 87. As to the silencing effect, regardless of this compact and relatively simple structure it can decrease the noise from the conventional normal value of 116 – 118 phons down to 70 phons. This type of the heat exchanger is relatively compact and economical to assemble, and, therefore, is suitable for being attached in a factory where many radiant tubes have to be installed.

Figure 15:
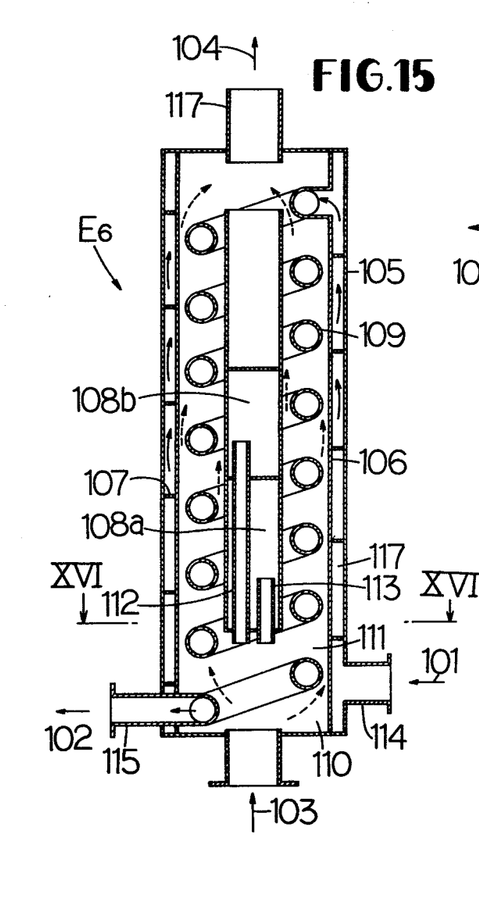
FIG. 15 is a vertical sectional front view of a heat exchanger of the sixth embodiment.

The sixth embodiment $E_6$ illustrated in FIGS. 15 and 16 is also the same in the general view as the foregoing ones, but the inside of the main body is a sort of compromise between the second embodiment and the fifth embodiment, where a coil-tube of heat exchanging ability and a central resonator in noise preventing ability are simultaneously or parallelly utilized; and its compact and economical structure is suitable as in the fifth embodiment for the multiple installation in one place. The air to be preheated 101 is introduced at the inlet 114 and directed upwardly through a narrow cylindrical passage 117 formed by an external cylinder 105 and an internal cylinder 106, the passage 117 being partitioned with a spiral diaphragmatic web 107 to make the air flowing and heat transferring effective; at the top it is fed into a spiral downwardly flowing coil tube 109 and discharged at the air outlet 115 as preheated air 102 for being supplied to the burner (not shown). The high temperature exhaust gas 103 is fed from the bottom and expanded to be blown upwardly through the space enveloped by the internal cylinder 106. In the central part of the main body $E_6$ are mounted resonators 108a and 108b, which are in communication with the expansion chambers 110 and 111 through respectively a connecting pipe 113 and 112, inside of the coil of the coil-tube 109. The heat of the high temperature exhaust gas 103 is transferred to the air in its ascending through the passage 117 and its descending through the coil-tube 109 which is completely exposed to the exhaust gas stream. The location of the resonators, right in the middle of the main body $E_6$ completely covered by the ascending and descending air streams as well as the rising exhaust gas stream is highly favorable in preventing the noise from going out of the apparatus $E_6$; and the relatively variable size and shape of the resonators are applicable to any desired sound waves of specific wavelength to be absorbed.

Even though this embodiment has a compact and relatively simple structure, the heat exchanging ability and silencing capacity are almost comparable to the foregoing apparatuses. The resulting record of the former is 800° C down to 200° C in the exhaust gas; from 20° C up to 620° C in the preheated air; and the latter is from 116 phons down to 70 phons.

The seventh embodiment $E_7$ is, as shown in FIGS. 17 to 20, a little different from the foregoing in its inside structure, although the general view $E_7$ and the spirit do not depart from the basic principle of this invention. The air 121 taken in at the air inlet 133 is directed upwardly through a narrow cylindrical air passage, formed by the double walls of the external cylinder 125 and the internal cylinder 126, and at the top introduced into an air preheating coil tube 127. It is discharged and supplied to the burner through an air outlet 135 at the bottom as preheated air 122. On the other hand the high temperature exhaust gas 123 is fed through the inlet 136 of the exhaust gas into a plurality of plenum chambers 128, 128a, which are connected in series through one or a plurality of connecting tubes 131 respectively therebetween. Each cylindrical plenum chamber, concentrically mounted with the main body $E_7$, is provided with a plurality of nozzles or slots 129 on its side wall for jetting high temperature exhaust gas 123 toward the coil tube 129 and the internal cylinder 126, due to the pressure difference, to impart the heat to the descending air, and the ascending air.

Figure 17:
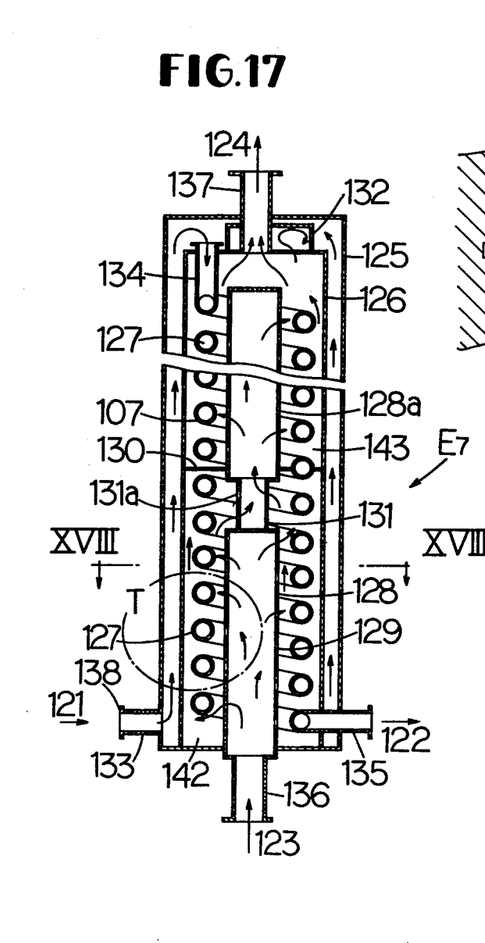
FIG. 17 is a vertical sectional view of a heat exchanger of the seventh embodiment.
Figures 18, 19, 20:
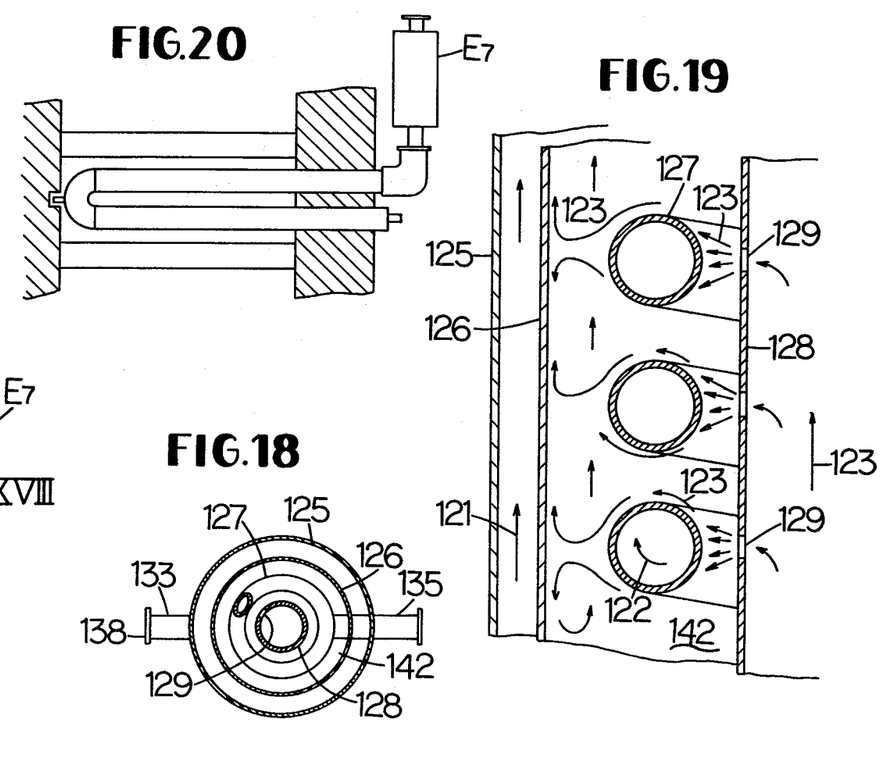
FIG. 18 is a transverse sectional view taken along the line XVIII — XVIII of FIG. 17.
FIG. 19 is an enlarged view of an essential part T of FIG. 17.
FIG. 20 is a vertical sectional view of a furnace in which the heat exchanger of this invention can be installed.

An expansion chamber 142 or 143, enveloped by the internal cylinder 126, is separated into a plurality of sections by one or a plurality of partition webs 130, each section containing a plenum chamber 128, and/or a connecting tube 131, as a unit; the exhaust gas 123 jetted into the expansion chamber 142, is collected into the connecting tube 131 through nozzles 131a, on its side wall and sent into the next plenum chamber 143, for repeating the operation. This lightly intricate process is highly effective in heat exchanging and noise reducing; a resonator 132 mounted at the top is of course contributive to the noise absorption in cooporation with the structure of plenum chamber and expansion chamber in both of which the sectional area of the exhaust gas passage varies repeatedly from a contracted to an expanded one and vice versa for contributing to noise absorption. As to the heat transferring and noise absorbing effect of the jetting of the exhaust gas 123, the resulting record of this embodiment will be described, referring to FIG. 19. When the exhaust gas 123 is jetted under the pressure of 35 mmAq the velocity of sectorally blowing the gas toward the coil tube 127, as shown in FIG. 19, is about 25m/sec; and the static pressure of the gas is decreased to 25 mmAq. During the repetition of this type process the temperature of the exhaust gas changed from around 800° C to around 200° C and that of the air from the room temperature to approximately 600° C. The record of silencing is also remarkable, that is from the conventional value 116 phons, at a place 1.5m away from the sound source, to about a permissible 70 phons.

FIG. 20 is indicative of a general sectional view of a radiant tube on which a heat exchanger of this embodiment $E_7$ is installed.

It will be obvious to those skilled in the art that various changes may be made without departing from the scope of the invention and the invention is not to be considered limited to what is shown in the drawings and described in the specification.

What I claim is:

1. A heat exchanger, for use in an industrial furnace, which utilizes the heat of combustion in a radiant tube of the furnace for preheating the combustion air for the furnace and which includes therein at least one silencing means for diminishing the combustion noise from the radiant tube, said heat exchanger, which is substantially a cylindrical body composed of multiple cylinders, comprises:
   a fairly narrow cylindrically shaped upward air passage defined by double cylindrical walls disposed at the outermost portion thereof;
   a downward air passage, communicating with said cylindrically shaped upward air passage, disposed concentrically therewith and on the inner side thereof;
   a passage for high temperature exhaust gas formed inside said upward air passage and disposed concentrically therewith;
   at least one resonator disposed inside said upward air passage;
   an inlet for the air to be heated disposed at a lower portion of the outer periphery of said heat exchanger in communication with said upward air passage;
   an outlet for the preheated air disposed at a lower portion of the outer periphery of said heat exchanger in communication with the lower end of said downward air passage;
   an inlet for the high temperature exhaust gas disposed at the bottom of said heat exchanger in communication with the lower end of said high temperature exhaust gas passage;
   an outlet for the exhaust gas disposed at the top of said heat exchanger in communication with the upper end of said high temperature gas passage;
   whereby the
   upward stream of the high temperature exhaust gas is able to impart simultaneously the heat thereof to both the upward and downward stream of air, and the
   dispositon of the air passage at the outermost side and of the exhaust gas in the central portion increases the efficiency in both the heat exchanging and noise preventing.

2. A heat exchanger as set forth in claim 1, wherein said cylindrically shaped air passage is partitioned spirally with a spiral diaphragmatic web.

3. A heat exchanger as set forth in claim 2, wherein said downward air passage is a cylindrical tube with a plurality of expanded portions and a plurality of fins disposed longitudinally on the outer periphery thereof between said expanded portions.

4. A heat exchanger as set forth in claim 2, wherein said downward air passage is a narrow cylindrically shaped passage partitioned spirally with a spiral diaphragmatic web.

5. A heat exchanger as set forth in claim 1, wherein said downward air passage is a spiral coil tube with a constant coil diameter and with a fairly large coil pitch.

6. A heat exchanger as set forth in claim 2, wherein said downward air passage is a spiral coil tube, the coil diameter of which is gradually enlarged and reduced alternately.

7. A heat exchanger as set forth in claim 4, wherein said exhaust gas passage comprises a lower expanded portion below said downward air passage, a narrow cylindrical shaped portion between said upward and downward air passages, and an upper expanded portion above said downward air passage, and wherein a plurality of resonators are disposed in the central portion of said heat exchanger and each resonator is respectively connected with the lower expanded portion of said exhaust gas passage by a connecting pipe.

8. A heat exchanger as set forth in claim 7, wherein an ultrasonic wave producer is provided at the inlet for the air to be heated and/or the inlet for the exhaust gas.

9. A heat exchanger as set forth in claim 5, wherein a plurality of resonators are disposed within the coil of said coil tube and each said resonator is respectively connected with the expanded portion of said exhaust gas passage by a connecting pipe.

10. A heat exchanger as set forth in claim 5, wherein a plurality of plenum chambers are serially connected to each other by a plurality of connecting tubes therebetween, provided with a plurality of nozzles or slots for jetting exhaust gas therefrom and are disposed cocentrically with and inside of said coil tube, and the exhaust gas passage is partitioned into a plurality of sections with a plurality of transverse diaphragmatic webs.

11. A heat exchanger in accordance with claim 1 wherein said passage for high temperature exhaust gas has alternating sections of relatively expanded and contracted sectional areas along the length thereof, whereby the alternating variations of the cross section of said exhaust gas passage silences combustion noise by the repeated expansion as well as with cooperation of said resonator.

* * * * *